United States Patent [19]

Burke, Jr.

[11] 4,235,707
[45] Nov. 25, 1980

[54] METHOD AND APPARATUS FOR TREATING SOLID MUNICIPAL REFUSE AND OTHER CELLULOSE CONTAINING MATERIAL

[75] Inventor: Jerry A. Burke, Jr., Richmond, Va.

[73] Assignee: Burke, Davoud & Associates, Richmond, Va.

[21] Appl. No.: 28,605

[22] Filed: Apr. 9, 1979

[51] Int. Cl.³ .............................................. B03B 1/06
[52] U.S. Cl. ........................................ 209/3; 209/10; 209/134; 209/142; 209/145; 209/638; 162/4; 162/21; 162/22; 241/1; 241/24; 241/301; 241/DIG. 38
[58] Field of Search .................... 209/930, 638, 639, 3, 209/10, 134–137, 142, 145; 162/4, 21, 22; 241/1, 301, 2, DIG. 38, 24; 239/592–594; 422/184; 89/145 B; 99/323.4

[56] References Cited

U.S. PATENT DOCUMENTS

| 369,836 | 9/1887 | Blackman | 162/22 |
|---|---|---|---|
| 2,539,990 | 1/1951 | Chapman et al. | 241/1 X |
| 3,352,498 | 11/1967 | Schulte | 241/1 |
| 3,597,308 | 8/1971 | Brooks | 162/4 |
| 3,738,483 | 6/1973 | MacKenzie | 209/137 X |
| 3,955,486 | 5/1976 | Strommer | 99/323.4 |
| 4,050,899 | 9/1977 | Grube et al. | 241/DIG. 38 X |
| 4,079,837 | 3/1978 | Grube et al. | 209/12 |
| 4,098,685 | 7/1978 | Akerlow et al. | 209/10 |
| 4,163,687 | 8/1979 | Marners et al. | 162/22 X |

FOREIGN PATENT DOCUMENTS 2715715 10/1977 Fed. Rep. of Germany .............. 162/4

Primary Examiner—Ralph J. Hill
Attorney, Agent, or Firm—Harold L. Stowell

[57] ABSTRACT

Solid Municipal Waste is loaded, or loaded and compacted, into a pressure vessel which has means for very fast opening for discharging the contents. The pressure vessel is pressurized, with steam, or a compressed gas such as compressed air. The pressure vessel can be fitted with a breech and a quick release muzzle cover and at the discharge end (muzzle) thereof is fitted with an orifice whose purpose is to promote a powerful turbulence and shock wave, through which the exiting solid material must pass to maintain pressure within the vessel during discharge, and to control the rate of discharge. The disruptive forces produced at the orifice, which can be either a sub-sonic, sonic, or supersonic flow orifice, are a function of the strength of the shock wave or the turbulence. The discharged material is then gravity separated in the wet or dry conditions and the separated materials are then employed in additional processes, or employed as landfill depending on its chemical and physical properties.

25 Claims, 14 Drawing Figures

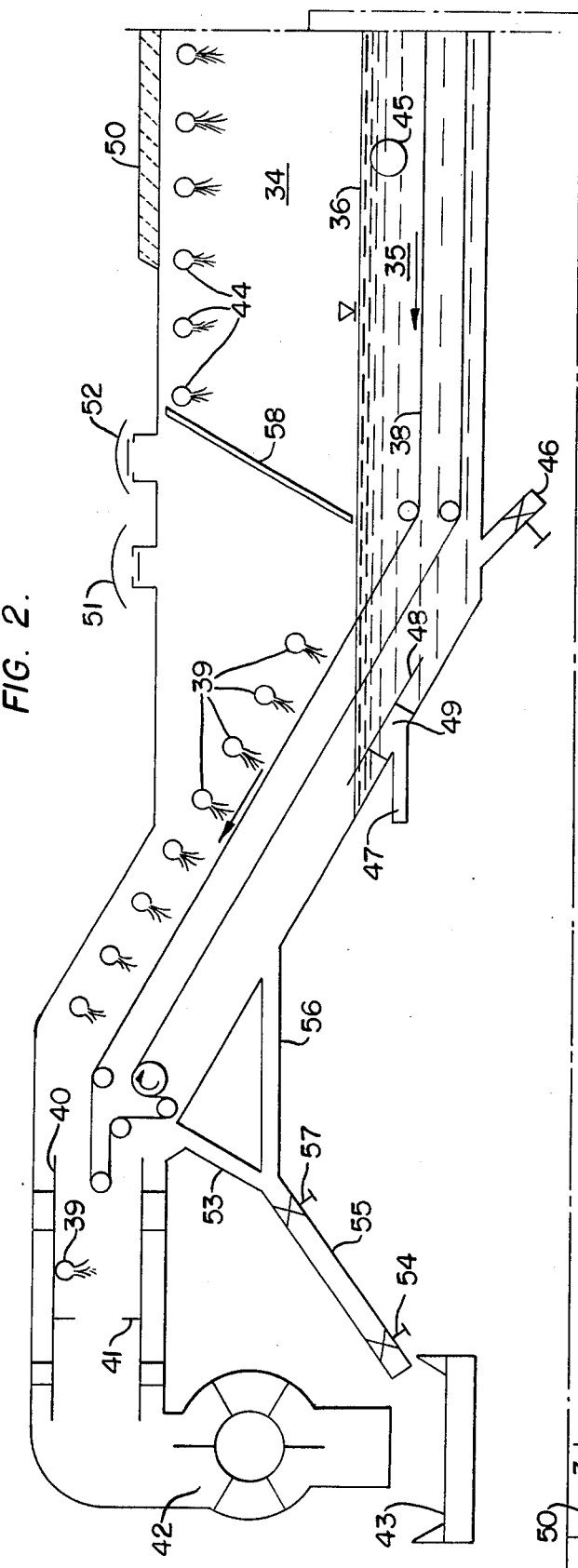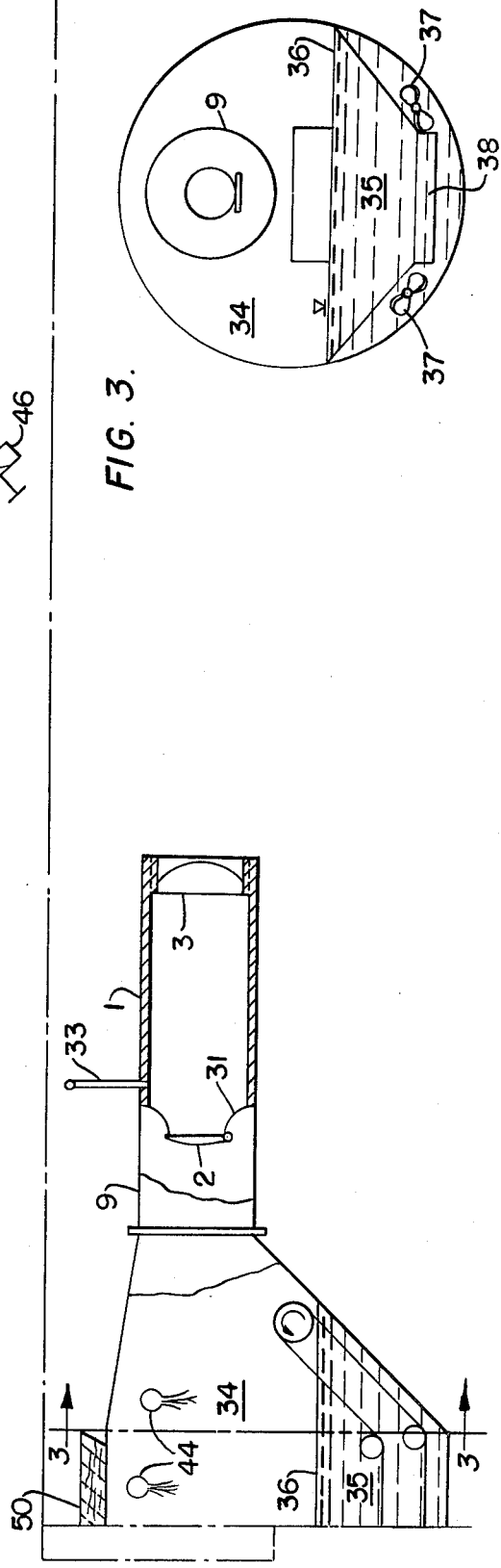

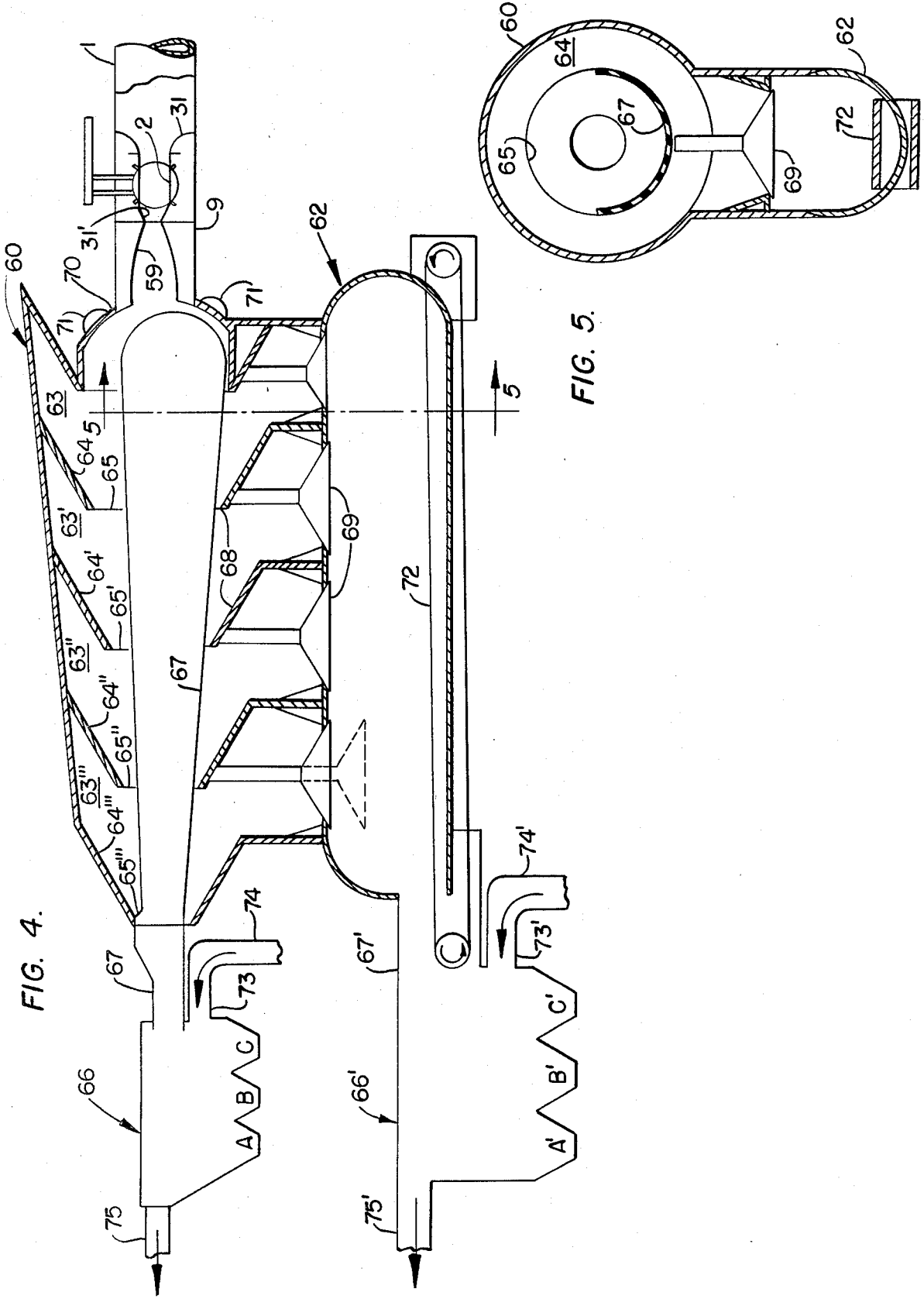

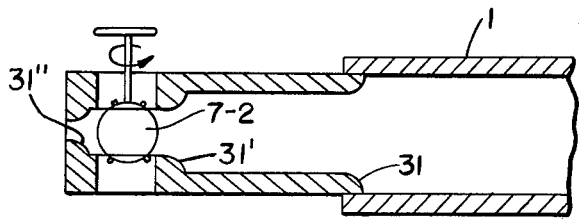
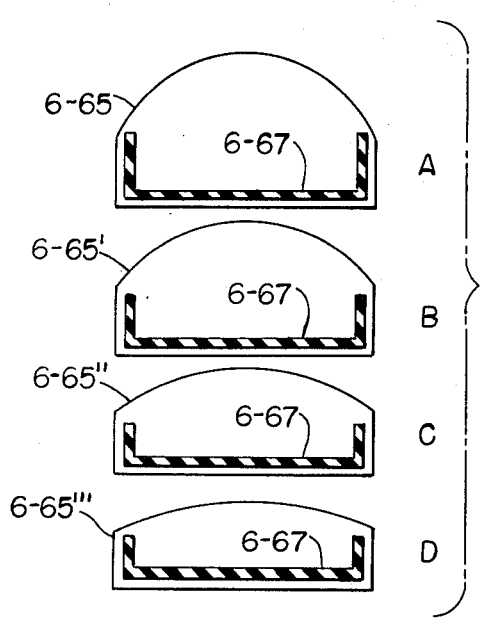
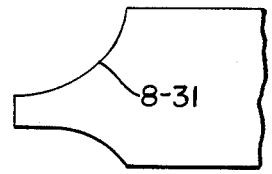
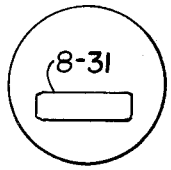
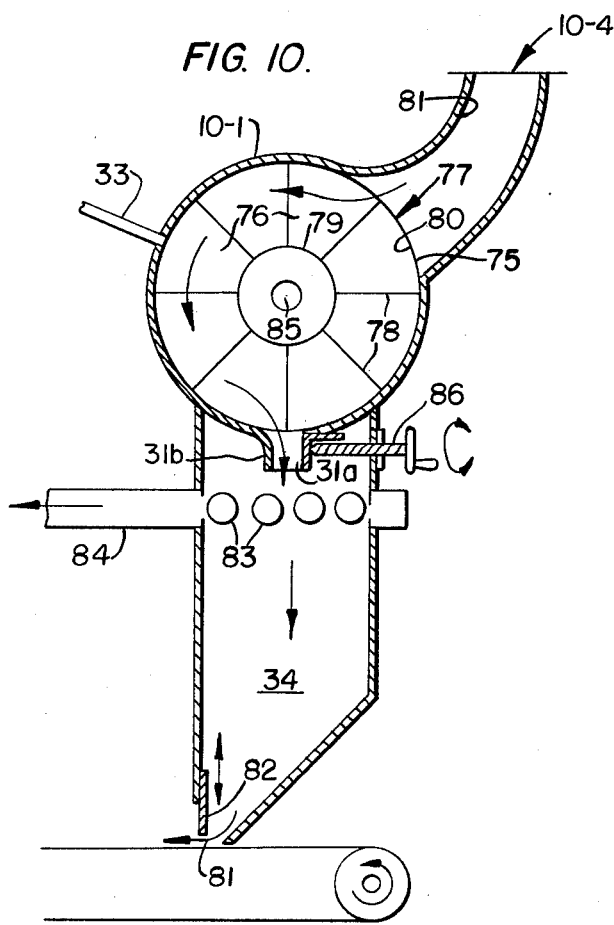
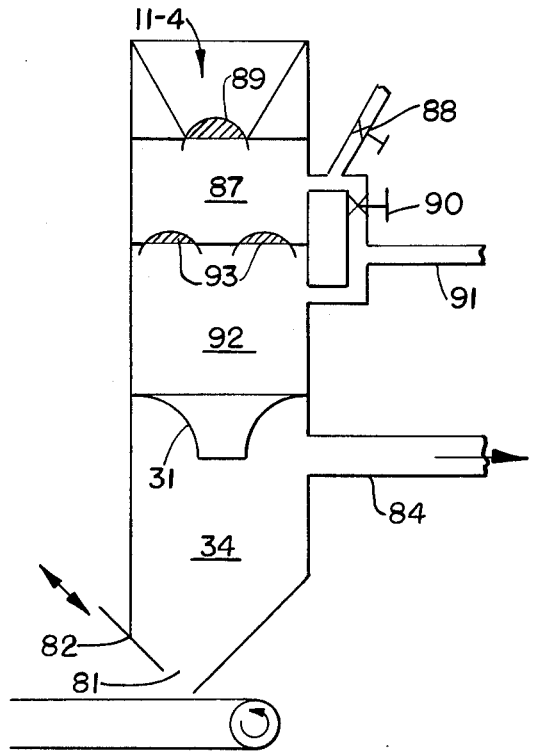

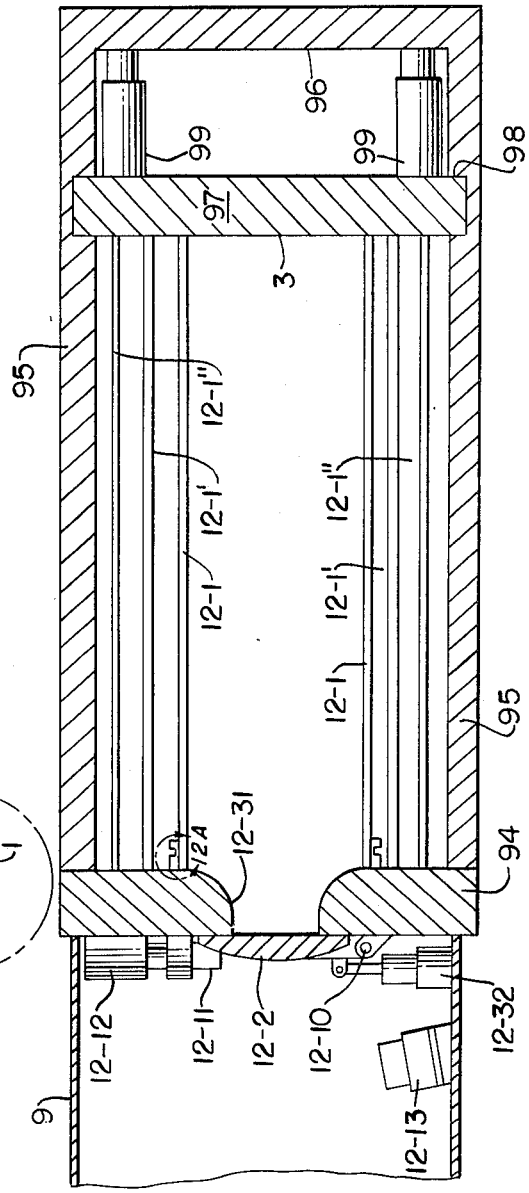
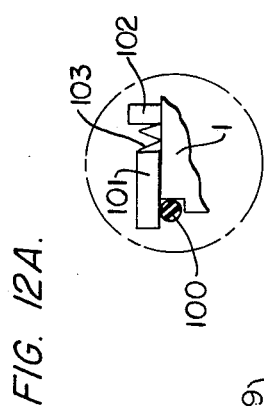
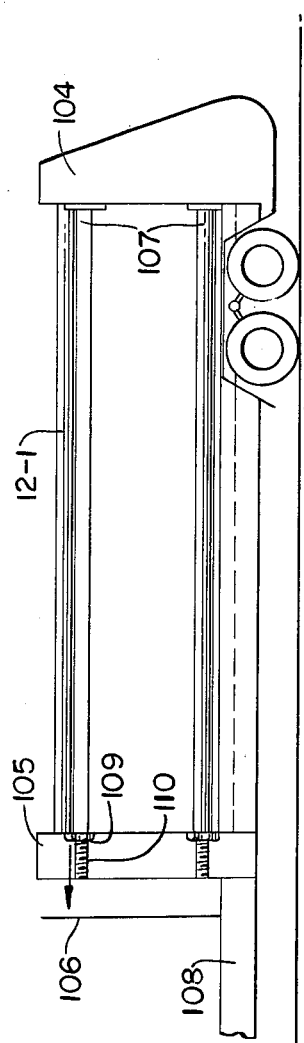

METHOD AND APPARATUS FOR TREATING SOLID MUNICIPAL REFUSE AND OTHER CELLULOSE CONTAINING MATERIAL

DESCRIPTION

1. Technical Field

This invention relates to apparatus and methods for size reduction of solid municipal refuse and other cellulose containing material, and for separating organic materials from the non-organic materials.

2. Background of Prior Art

It is known in the art to render wood chips and other materials into an expanded form for use, for example, in making paper-like products. Patents disclosing such methods and apparatus are:

U.S. Pat. No. 21,077—Lyman
U.S. Pat. No. 1,578,609—Mason
U.S. Pat. No. 1,793,711—Mitscherling
U.S. Pat. No. 1,979,341—Olsen
U.S. Pat. No. 2,805,946—Boehm et al.

Further a strong incentive exists today to make use of collected solid municipal waste (SMW), agriculture and forest waste as well as growing plants, for example, for:

1. Resource recovery, including that of iron, steel and aluminum;
2. Conversion of cellulosic and other biodegradable material to sugar, methane, alcohols, and to other chemical feedstocks as well as to food stuffs;
3. Preparation of SMW for combustion in conjunction with power generation; and
4. Reduction of bulk for subsequent disposal in view of the high cost of disposal of untreated SMW by so-called sanitary landfill. Sites are increasingly expensive and increasingly difficult to find. A significant reduction in bulk and mass for ultimate disposal has, therefore, a strong economic incentive.

For the above purpose or puporses, methods have been devised and tried with a range of sizes of equipment, varying from laboratory scale to large pilot scale to full scale.

These conventional methods vary somewhat in detail, but in general follow a sequence as herewith described. Solid Municipal Waste is used as an example because it contains a wide range of material; it requires a large number of unit operations to reduce size and separate the constituents, and the disposal of SMW is a most pressing problem for government units.

1. Collected refuse is reduced in size by a hammermill shredder or by any of the several types of similar machines capable of this work.
2. The crushed and shredded material from Step 1 is passed over an electro-magnetic device to separate ferrous metals from the main stream of material.
3. The remaining stream is passed through a trommel screen which allows much of a fine, small heavy material like glass, sand, rocks, etc., to fall through the trommel screen mesh. Sometimes a trommel screen is used before the shredder to remove heavy constituents up to 3" maximum diameter. This procedure reduces the load on the first shredder.
4. The remaining fraction which is too large to fall through the trommel screen mesh is passed through an air classifier which uses flowing air in a winnowing process to further separate the light weight fraction such as paper, wood fiber, sawdust, etc., from the remaining heavy fraction.
5. Aluminum and other non-ferrous metals would normally be found in the heavy fraction taken out by the trommel screen and the air classifier. These materials may be separated by an electric eddy-current machine that repels conductive material.
6. The light fraction of Step 4 is often shredded again for further size reduction.
7. The tail-end heavy fraction stream contains glass, rocks, ashes, bones, etc. There is not a real market for this material now, and it is generally used to fill depressions in land.

More than one stage of any of the above steps can be employed to achieve any degree of separation and/or size reduction desired.

The final light fraction, including the bulk of the cellulosic material and the plastics, can be used "as is" or further converted by chemical or biological means.

The above-described process, and minor variations of it, often collectively referred to as "front-end preparation" have serious problems in operation with respect to energy consumption and machine operation including those listed below:

1. All energy consumed in shredding is lost to the surrounding air. Subsequent use of organic material for chemical feedstock or bio-conversion may require extensive additional input of heat.
2. Excessive maintenance costs and unacceptable down-time of shredding equipment threatens the economic and practical viability of such processes as are presently in operation.
3. The process is accompanied by such socially unacceptable characteristics as high noise level, odor, dust, flies, and the potential for explosions.
4. The compacting of metal containers by hammer-milling thus entrapping dirt and foreign matter is undesirable for metals recovery. Tinned steel cans compacted to a small volume are unsuitable for de-tinning, which has become an economically desirable operation as the price of tin continues to increase.
5. High first cost of the front-end machinery reduces the economic incentive for waste recycling aimed at cellulose conversion and resource recovery. Basically, shredding machinery is of the rotative and impact types, which has to operate in dusty and abrasive conditions. To work and survive its own created environment, the machinery has to be robust and heavy which equates to high cost and as experience shows, still requires extensive maintenance.

BRIEF SUMMARY OF INVENTION

The method and apparatus of the present invention, in general, comprises:

1. Solid Municipal Waste (SMW) or other material is loaded, or loaded and compacted, into a pressure vessel which incorporates a method and means for very fast opening for discharging the contents.
2. The pressure vessel is pressurized, with steam, or a compressed gas such as compressed air. The desired degree of size reduction and the desired end condition of the processed material (dry or wet) dictates the compressible and expansive medium (saturated steam or a dry gas) and the pressure to be employed.
3. The pressure vessel can be fitted with a breech and a quick release muzzle cover and at the discharge end (muzzle) thereof is fitted with an orifice whose purpose is to promote a powerful turbulence and shock wave, through which the exiting solid material must pass to maintain pressure within the vessel during discharge, and to control the rate of discharge.

The disruptive forces produced at the orifice, which can be either a sub-sonic, sonic, or supersonic flow orifice, are a function of the strength of the shock wave or the turbulence. This in its turn depends on the velocity of the gas passing through the orifice, which is in its turn a function of the pressure in the vessel and the orifice or nozzle design.

4. The discharged material is then gravity separated in the wet or dry conditions and the separated materials are then employed in additional processes, or employed as landfill depending on its chemical and physical properties.

BRIEF DESCRIPTION OF THE DRAWING

The invention will be more particularly described in reference to the accompanying drawings wherein:

FIG. 2 is a somewhat diagrammatic longitudinal sectional view of a modified form of the present invention;

FIG. 3 is a section on line 3—3 of FIG. 2;

FIG. 4 is a somewhat diagramatic sectional view of a further form of apparatus for carrying out the methods of the present invention;

FIG. 5 is a section substantially on line 5—5 of FIG. 4;

FIGS. 6A–D are cross-sectional views like FIG. 4 of a further modified form of the present invention;

FIG. 7 is a fragmentary view of a pressure vessel having a multiple step nozzle or orifice, and a ball-type nozzle closure;

FIGS. 8 and 9 show modified forms of exit nozzles useful for the pressure vessels of the present invention;

FIG. 10 illustrates the use of a rotary continuous flow pressure vessel having an adjustable nozzle;

FIG. 11 illustrates apparatus having means for batch feed and continuous discharge;

FIG. 12 illustrates a pressure vessel wherein the pressure vessel body may be of various diameters and lengths;

FIG. 12a is an enlarged diagrammatic view of a portion of the apparatus illustrated in FIG. 12; and FIG. 13 schematically illustrates the rear end of a motor truck of the self-loading packer type in which the main container may comprise the main body of the pressure vessel of the device illustrated in FIGS. 12 and 12a.

DETAILED DESCRIPTION OF THE INVENTION

Figure 1:
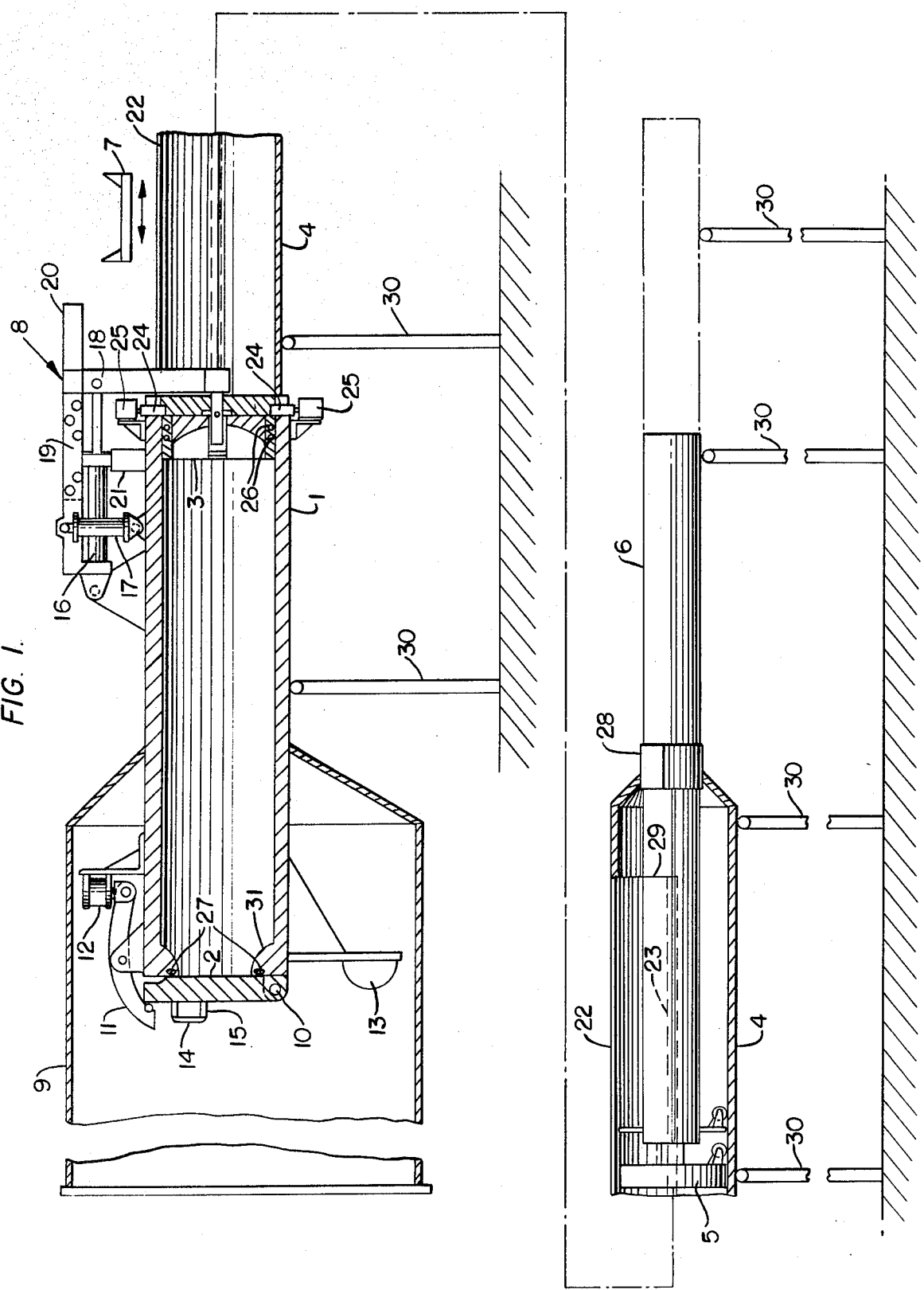
FIG. 1 is an elevational view in partial section of a pressure vessel, and receiving container suitable for carrying out the objects of the present invention.

Referring to FIG. 1, illustrating a pressure vessel, hereinafter referred to as a "cannon" attached to a portion of a partical separating device or tank, the cannon tube 1 is fitted with a hozzle closure 2, a breech closure 3, a loading chest 4, a ram 5, a ram drive mechanism contained in a housing 6 outlet constrictor or nozzle 31, a loading conveyor 7, and a breech opening mechanism 8. A section of the separation tank is designated 9.

The hinged muzzle closure 2 is held in place by a hinge 10 and a latch 11. The latch releases the closure 2 when fluid pressure in cylinder 12 depresses the tail of the latch and the roller in the headend of the latch moves off the closure 2. The closure which is opened rapidly by the pressure inside the cannon is stopped by the deaccelerator 13 which may be a fluid shock absorber of rubber or other reasonable elastomeric material. The elevated platform 14 contacts the shock absorber 13 and as illustrated, the platform is separated from closure 2 by legs 15 to elevate 14 above the thermal insulation that may be on the closure 2 and to prevent the closure from contacting the rubber absorber 13, which could melt or burn.

The breech operating mechanism 8 is moved by two pressure cylinders 16 and 17. When cylinder 16 is extended it opens the breech 3 via linkage 18. The linkage moves the breech parallel and concentric with the tube 1, because linkage 18 is connected to a traveler 19, which travels back and forth in guide 20. The vertical position of the breech 3 is controlled by the cylinder 17 and stop 21. Once the breech is clear of the tube, cylinder 17 is extended which swings the breech up and clear of the loading chest 4 and the stop 21.

When the ram 5 is retracted, the double chest doors 22 are opened along hinge line 23 by links (not shown) so that conveyor 7 can drop material into the chest. The conveyor 7 shuttles back and forth as shown by the directional arrow between the tube 1 and the retracted ram 5 to deposit an evenly distributed load into the chest 4.

After the chest is filled, the two doors 22 are closed, as shown in FIG. 1; the ram 5 pushes the material into the cannon and compacts the material to the desired density. It has been found that 20 pounds per cu. ft. is a practical value.

The process of loading just described is carried out a number of times until the tube 1 is filled. Then the breach is closed by mechanism 8. Once in place, breech pins 24 are pushed into place by pressure cylinder 25, of which there can be 20 to 30 pin sets around the breech ring.

The seal rings 26 are extended from grooves in the breech by fluid pressure until they contact tube 1 and seal. Also, the closure 2 is pushed closed by a pressure cylinder as shown in FIG. 1, until it seals against seal 27.

With the tube loaded with material and sealed, it is charged to the desired pressure with a compressible fluid (hot or cold). When ready, cylinder 12 is extended thus releasing the closure 2. The closure 2 opens and the contents of the tube explodes and expands, etc. into the separator tank 9. The remainder of the tank 9 can be of the type shown in FIG. 2 or of the type shown in FIGS. 3 and 4. Other types of pressure vessels or cannon can be of the types shown in FIGS. 4 and 7, 8, 10, 11, and 12.

Referring again to FIG. 1, the ram 5 is driven by a mechanism contained in housing 6, which in turn is held by collar 28.

A particular feature of the ram arrangement is the adjustability of the ram in collar 28. As shown in FIG. 1, the ram housing 6 is adjusted in the collar 28 such that the chest can be filled with loose material and the material can be pushed to the front of the cannon. Also cannon liners, which are thin walled, open end tubes sized to fit full diameter and full length of the inside of the cannon can be compacted by separate stationary compactors as by mobile compactors and loaded into the cannon for discharging.

To accommodate the liner in the chest, the ram and its mechanism is moved back away from the cannon breech. The ram 5 is moved to the right of the door end 29 and the housing 6 is moved to the space shown by the dotted line extension.

The movement of the housing 6 in collar 28 is self-propelled by locking the ram 5 in chest 4 by pins temporarily pushed through the chest wall (not shown). The ram being held allows the housing 6 to move in the loosened collar 28.

Columns 30 are cannon, chest and ram support structures. If steam is employed, the cannon length would increase and the columns would allow contraction and expansion to occur.

Referring now to FIG. 2 illustrating, in section, a cannon combined with a "wet" separator tank. The cannon 1 is equipped with a muzzle constrictor 31, a muzzle closure 2, a breech 3, and a compressible medium feed line 33. The cannon when loaded with material and charged with an expandable medium will, when closure 2 is unlatched, discharge its contents through separator extension 9 into the main free volume of the separator tank 34. The rapid expansion and turbulence reduces the size of the fragile portion of the cannon load (sometimes called the light fraction). The heavy fraction falls through the free volume 34 into the liquid volume 35 by passing through the plane of the liquid surface 36. The heavy fraction being that which will sink in the liquid volume 35, even when the volume is gently stirred by propellers 37 in FIG. 3, and settle onto the conveyor belt 38. The heavy fraction sometimes called the hard fraction if municipal solid refuse were being separated is hauled up the conveyor incline above the liquid level 36 and is exposed to the liquid showers 39, which washes the light fraction off and lets it flow back to the liquid volume 35. After being washed the hard fraction is dumped into a tumbler 40, (herein represented by a rotating cylinder) wherein the material is rotated to dump entrapped water and to flush out the light fraction by spray 39.

The material then passes over ring partition 41 into the tail end of the tumbler wherein it is dried. From the tumbler the heavy fraction drops into a star valve type pressure port 42. The heavy fraction continues through the port 42 and drops onto conveyor 43 on which it is carried to further processes for resource recovery or disposal.

When the cannon discharges into the separator, rapid expansion occurs. The light fraction flies around in the free volume 34; but it is knocked down into the water volume by liquid sprays 44. The space is cleared and the walls are washed down by torrents of liquid sprayed into the tank through the sprays 44 and 39. If steam is the expanding medium, then the sprays 44 would use water and the spray would condense the expanded steam in zone 34 to control the pressure rise in the separator. The light fraction mixed into the liquid is pumped off through conduits 45 or 47. Conduit 45 is fitted with a rotating self-cleaning screen to prevent large objects from passing onto other downstream processes. Conduit 46 is employed to remove sediment of fine, hard or heavy fraction that would otherwise collect in the tank. The exit 47 is fitted with a belt screen 48 and a screen box 49. The belt screen is also a conveyor which carries collected, hard, ropy material, plastic sheets, etc., to a second set consisting of a tumbler and a star valve and disposal conveyor similar to parts 40, 42, and 43, hereinbefore described. This second set is not shown for clarity, and only a segment of the screen conveyor 48 is shown.

The separator tank is provided with an insulation layer 50, vacuum relief valves 51, and pressure relief valves 52. The fine heavy material washed from tumbler 40 is concentrated in the conduits 53, and 55, and is trapped by closed valve 54. Liquid and light fraction passes back to liquid volume 35 via conduits 55 and 56. When trap 55 is to be dumped, valve 57 is closed and valve 54 is opened momentarily. Plate 58 in the body of the tank prevents the heavy fraction from injuring the conveyor belt above the water line, by making all fraction pass through the shock absorbing liquid. Also, the plate 58 plus others similar to it can be used as an anvil to further reduce the size of the hard fraction ingredients discharged from the cannon.

Referring now to FIGS. 4 and 5, there is shown, in section, a cannon 1 connected to a separation tank of the dry type that does much of the separation by the pulse flow of expanding gas from the cannon. An air classifier for polishing is connected to each separator discharge line. A fragment of a cannon 1 together with the muzzle stricture 31, a ball type muzzle closure 2, a second step stricture 31' and an expansion skirt 59 in the separator tank. Section 9 is attached to the main body of the separation tank 60. The separator proper is composed of three main parts—the main tank 60 which is a conical, horizontal section, a vibratory conveyor 67, and a surge tank 62. These sections are fitted with equipment as follows. The tank 60 is sub-divided into connecting compartments 63, 63', 63'' and 63''' by a plurality of conical partition 64, 64', 64'' and 64'''. The outside diameter of each cone gets smaller as the cone diameter of the tank 60 decreases. Further, there is a hole or opening 65 through the apex of each cone. The holes 65 in the cones get smaller with each successive cone hole from 65 to 65'''.

Passing through the center of the tank 60 substantially from the expansion skirt 59 to the air classifier 66 is the vibratory conveyor 67 and the drive mechanism for the conveyor has been omitted from the drawing. Most of the heavy fraction discharged from the cannon lands on the conveyor 67, which in this case takes the form of a tapered semicircular trough 67 (FIG. 5).

When the cannon is discharged, the heavy fraction falls onto the conveyor and is moved into the air classifier 66. Some of the light fraction is also projected along the conveyor toward the air classifier 66.

The light fraction in the main is composed of small pieces of light weight material which is moved by the flow of gas through the tank 60. As the gas volume with the entrained light fraction leaves compartment 63 by flowing through hole 65, the next hole 65' is much smaller in area and all of the gas cannot squeeze therethrough so it reverses its direction and flows into compartment 63' and the light fraction falls into transfer tube 68 through check valve 69, then into surge tank 62.

At each hole in a conical partition called a reversal station, some gas with the entrained light fractions passes through with the hard fraction but a portion of the gas and light fraction is skimmed off and is passed to tank 62. The series of check valves 69 is to prevent back flow from tank 62. The flow through tank 60 takes the form of a pulse of a few seconds duration (for a batch cannon), and as the pulse passes down the tank, a low pressure area forms behind the main surge of gas. Thus, the series of check valves prevent separated light fraction from flowing back into the tank. Appropriate inflow check valves 71 are located in the tank head 70.

The light fraction in the surge tank 62 settles on conveyor 72 and is carried to air classifier 66'. The two air classifiers 66 and 66' are the horizontal types—any of the other types, i.e., the vertical, the zig-zag, the rotating cylinder or the cyclone types would be satisfactory. The description of classifier 66' would be substantially the same as that given for 66 except the material entering 66' is mostly light fraction with a small part of heavy fraction and entering classifier 66 is mainly the heavy fraction with some carry-over of light fraction.

The classifier 66 receives mixed material from conveyor 67 which spills through the air stream 73 issuing from air duct 74. As the light fraction blows across the classifier, some falls into outlet A and some passes out through air outlet 75. The heavy fraction falls into outlet C, whereas a mixture of intermediate light and heavy fractions would fall in outlet B. The separated flow from these outlets can be carried away by any conveyor or conveyance desired.

FIGS. 6 illustrate an alternative form of, or shape of "conical" compartment, conveyor 67 and hole shape between partitions 64 and similar components are designated with the same reference characters preceded by the numeral 6.

It is pointed out that conveyor 67 is illustrated in FIGS. 4 and 5 to be a tapered semi-circular trough, because it is easier to illustrate the decreasing areas of the round holes 65 to 65'''—actually a flat bed conveyor 67 shown in FIG. 6 with either rectangular or curving sides would be used. The holes in the cones rather than being round would be a combination of elipse and rectangle as shown at 6-65 to 6-65''' in FIG. 6. The horizontal width being the same for the entire length of the conveyor—only the vertical distance would get smaller at each station when moving in the direction of the outlet.

As illustrated conveyors 67 and 6-67 are vibratory types in which the frame and drive mechanism is not shown. It is an excellent type conveyor for the job because the floor can be fitted with impact resistant material which in turn can be replaced as necessary; however, a belted conveyor such as conveyor 72 can be used.

FIG. 7 illustrates a fragment of a cannon 1 with a multi-step nozzle or orifice and a ball type muzzle closure.

It has been found that a one step nozzle 31 in FIGS. 1 and 2 allows certain types of material such as a thick telephone book to emerge with a cluster of page fragments and not completely size reduced. Thus, as much as one-half of one percent of paper if a large number of books and catalogs are present would not be thoroughly processed. In such cases, a multi-step nozzle as shown at 31, 31' and 31'' in FIG. 7, and 31 and 31' in FIG. 4 may be used. The usual step down from the tube diameter to the throat diameter can be taken in two or three steps to provide a more uniform particle size. It is important, however, to provide a straight section or "run" between each step such as the spacing between 31 and 31' and 31'', shown in FIG. 7. The "run" allows the larger fragments to become untangled from the mass and to be more vigorously worked on in successive steps.

The throat of the ball valve 7-2 should be the same diameter as the run diameter.

The strictures, nozzles, or orifices may be round, square, and particularly rectangular nozzles as at 8-31 shown in FIGS. 8 and 9 can be used. It will be noted the nozzle can be located off center as shown. Such rectangular nozzles are often used in wind tunnels and other fluid flow devices.

FIG. 10 shows a rotary continuous flow size reduction cannon in combination with a separator having an adjustable nozzle. This cannon system has the same essential parts as the batch cannon illustrated in FIGS. 1 and 2.

The purpose of the batch type apparatus is to reduce the size of widely varying feed material; but for material that is more uniform in particle size, a continuous feed cannon can be used.

The loading chest 10-4 is on a continuous basis kept filled with feed material, which flows down by gravity, vibration, or other conveyance system to fill the compartments 76 in rotor 75, which runs close-fitting in Case 10-1. The compartment 76 is formed by vanes 78 attached to hub 79 and endplates 80 on each end of the hub. All the compartments form pressure tight vessels except for the compartments being presented to chest 10-4 for filling. As the rotor 77 rotates, the cam section 81 of the chest wall gradually forces loose material into the cooperating cavities 76. When the filled cavity mates with the pressure fluid supply conduit 33, the cavity will become pressurized. Leakage of the fluid is reduced by the close-fitting end plates 80 and vanes 78 with the Case wall 10-1. When a filled and pressurized cavity mates with the nozzle opening 31, the pressurized material expands from the cavity 76 into the separator tank space 34 and is reduced in size by the violence of fluid expansion, turbulence, etc., as above herein taught. The heavy fraction passes out of the tank by opening 81 which is adjustable by sliding door 82. The light fraction passes out of the separator through the holes 83 and finally by conduit 84. Depending on the nature of the material more or less, of holes 83 can be used—several tiers of holes and conduits can be used and the tank space 34 can be divided by inserted conical or pyramidal dividers to cause staged flow reversal.

The rotor wheel 75 is turned by an external torque being applied to the rotor through the shaft 85 in hub 79. The nozzle 31, in the form of the invention, is rectangular and its long side runs the length of the rotor. The nozzle opening is adjustable since one lip is movable and can be moved closer to or away from lip 31a by the screw 86.

FIG. 11 illustrates a continuous cannon system that uses a batch feed with a continuous blow down or discharge. Material to be processed is continuously loaded into chest 11-4. The material fills chest 11-4 until the pressure in compartment 87 is equalized with the pressure in chest 11-4 by bleeding down the pressure through valve 88. Once equalized, check valve 89 opens inward by the weight of the load in chest 11-4 and allows chest 11-4 to dump its contents into cavity 87. Valve 88 is closed, valve 90 is opened, and pressure fluid in conduit 91 fills zone 87 to the same or to a higher pressure than in cavity 92. The material in zone 87 flows or is dumped into cavity 92 through check valves 93. Once dumped, the valve 90 is closed, bleed off valve 88 is opened and again material which is loaded into chest 11-4 dumps into zone 87 and then into cavity 92. The loading rate must equal the discharge rate through the nozzle.

The material in zone 92 can be kept under pressure by the continuous supply of fluid through conduit 91. From 92 the material is discharged through the nozzle 31 to be exploded and size reduced, and is caught in separator 34. The separator in FIG. 11 operates the same as that described in reference to FIG. 10.

FIG. 12 illustrates a cannon which can accommodate cannon tubes of various diameters and lengths.

The orifice plate 94 is fixed to a segment of the separator 9. It is fitted with a hinge 12-10, a closure 12-2, and an opening 12-31. The closure works with a sliding latch, a latch activator 12-12, a closure deaccelerator 12-13, and a closure cylinder 12-32.

The plate 94 is also fitted with at least four ties 95 (only 2 are seen) which secure a fixed breech plate 96 to the nozzle plate.

A moveable breech plate 97 is slidably connected to the ties 95 as at 98. The moveable breech 97 is moved back and forth along the ties by pressure cylinders or screws 99.

Three different cannon tubes 12-1, 12-1', and 12-1" are shown clamped between plates 94 and 97. The tubes are held in pressure-tight sealed condition by the tube endseals shown in the enlarged insert; a seal is shown on one end of tube 12-1 only. Consider that each end of each tube must have a sealing means.

The fluid is supplied to the inside of the tube through the nozzle plate 94 and through moveable breech plate 98. The o-ring 100 fits into a recess machined into the end of the tube 12-1; the ring band 101 fits close but slidable on the end of tube 12-1. The ring is positioned by the anchor ring 102 and spring 103.

When the tube 12-1 is clamped between plates 94 and 98, the bands 101 on both ends of the tube slide back and allow the o-ring to be clamped between the plates and the tube; to form a seal the band 101 supports the o-ring. Any type seal is acceptable.

The three tubes would not be in place at one time. FIG. 12 illustrates the range of tube diameter that can be accommodated. Also it is seen that tubes of different length can be accommodated by the range of movement of breech plate 97. The purpose of such an arrangement is to accommodate cannon tubes that were loaded with material elsewhere. It is envisioned that tube 12-1 would be loaded when on a small packer truck while making collections in a residential area. Tube 12-1', the larger diameter and perhaps longer than tube 12-1, would be loaded at a transfer staton and hauled a long distance into the cannon. Tube 12-1" may be ideal for loading, at the cannon location, material that is brought in by present conventional packer trucks and stake body vehicles.

FIG. 13 schematically represents the rear end of a motor truck and particularly the self-loading packer truck body in which one element is the cannon tube 12-1 which is also shown in FIG. 12.

The truck chassis 108 supports the cab forward of line 106 which may be the rear wall of the cab. A moveable or slidable front plate 105 and a fixed plate and packer box 104, which is permanently fixed to the back of the chassis may also be provided.

The front plate 105 is connected to the four tie beams 107 by nuts 109 and screw 110. The ties are permanently attached to the packer box 104.

To place an open ended tube onto the truck, plate 105 is moved forward by rotating the four nuts 109 that are hooked together by link chain and sprockets (not shown).

When the nuts are driven by a motor, the nuts are moved forward on the fixed screws 110 and plate 105 is carried forward to make a space between 104 and 105 which is longer than the tube 12-1.

The tube 12-1 is then placed in this space and rests on blocks and cradle which are supported by the chassis. Once in place the nuts 109 are reversed, plate 105 moves back to clamp and seal the tube 12-1 between 105 and 104. Material can then be loaded into the chest built into box 104 from whence it will be transferred to and compacted into the tube 12-1 by any one of several types of mechanisms now in general use that may be contained in packer box 104.

The loaded tubes and the empty tubes can be repeatedly transferred between the cannon and truck by any of several types of heavy materials handling equipment now in cannon use. A part of the transfer equipment could include end plates that could be applied to the open ended tubes during transfer to prevent spillage.

DETAILED DESCRIPTION OF THE PROCESS ASPECTS OF THE INVENTION

As briefly set forth hereinbefore the primary steps of the method of the invention comprise:

Solid Municipal Waste (SMW) or other material is loaded, or loaded and compacted, into a pressure vessel which incorporates means for very fast opening for discharging the contents.

The pressure vessel is pressurized, with steam, or a compressed gas such as compressed air. The desired degree of size reduction and the desired end condition of the processed material (dry or wet) determines the compressible and expansive medium (saturated steam or a dry gas) and the pressure to be employed.

The pressure vessel or cannon is loaded directly with solid material either loose or baled, and the solid material is thereafter compacted.

Alternatively, a cylindrical thin walled perforated cannister, open at both ends, can be loaded separately, and slid into the cannon.

The cannon can be fitted with a breech and a quick release muzzle cover. It can be loaded at the breech, or at the muzzle in which case a breech would not be necessary.

The discharge end (muzzle) of the cannon is fitted with an orifice whose purpose is to promote a powerful turbulence and shock wave, through which the exiting solid material must pass to maintain pressure within the cannon during discharge, and to control the rate of discharge.

The disruptive forces produced at the orifice, which can be either a sub-sonic, sonic, or super-sonic flow orifice, are a function of the strength of the shock wave or the turbulence. This in its turn depends on the velocity of the gas passing through the orifice, which is in its turn a function of the pressure in the vessel and the shape of the orifice, or more particularly, to the orifice or nozzle design. Exit velocities near the speed of sound and also in excess of Mach 1 for the material flowing produce powerful disruptive forces, and highly effective size reduction.

Other purposes of such nozzles or devices are: to provide a sudden acceleration, and deceleration decompression of the gas and charge material as it leaves the cannon while, and immediately after, passing through the nozzle. Gas exiting from the cannon, due to the ratio of diameter of the cannon bore to the orifice throat diameter, will have a relatively low velocity as it approaches the orifice. This results from a relatively low rate of decompression in the cannon; but as soon as gas reaches the entrance to the orifice, there begins a rapid pressure drop accompanied by a rapid increase in velocity. The gas velocity accelerates from an approach speed of a few feet per second to the velocity appropriate to the gas conditions which may be very high in just a few inches of travel. The gas pressure drops in proportion to its velocity increase. The other material in the cannon moves with the gas—in fact, is moved by the gas—and undergoes sudden acceleration, decompression and deceleration as does the gas. The difference in velocity of the gas and the other material causes flutter which is also a powerful disruptive and size reduction force. The advantage of the sudden decompression is that while under compression in the cannon, the gas, whether it be steam, air, nitrogen, or other gas or vapor penetrates into the cells, pores, interstices, and voids in the material, and resides therein at high pressure, close to the measurable pressure in the cannon. The nozzle then provides a means of maintaining the material in the cannon under pressure until it passes through the orifice, during which time it is subject to very rapid decompression. During its passage through the nozzle to the outside of the cannon, the pressurized gas or vapor in the material explosively expands and tears, ruptures, and rends the absorbent type materials. Most cellulosic material, for instance, has thin coverings or casings. Steam or gas can leak out easily and non-explosively during a slow decompression. For good results, the quicker the decompression, the better.

The orifice size (diameter) in relation to the cannon diameter is important. If the orifice is too small, the gas velocity available to move the material to the orifice will be too low. On the other hand, if the nozzle diameter is too large in relation to the cannon diameter, then as the pressure reduces within the cannon itself, a relatively gradual decompression will occur. It has been calculated that a nozzle throat diameter of approximately 0.5 of the tube diameter is near optimum. It is recognized that material such as sawdust, seeds, bark, and wood chips will have a different response to the orifice approach gas velocity than does compressed SMW; and thus a different orifice-to-cannon diameter ratio may be required for optimum results, for those materials.

It is pointed out that different gases have greatly different critical (sonic) velocities. Depending then on the selected operating conditions and the consistency of the material and the gas, effective nozzle dimension must be selected within close limits.

When a condensable expansive medium such as steam or freon is used, the material becomes filled with saturated liquid. Upon sudden depressurization, the saturated liquid begins to flash to vapor. Only a portion of the liquid flashes, but the overall expansion ratio is much greater than a dry gas expanding from the same high to lower pressure states. If an expanded or exploded product wet with the liquid is usable, then a condensable vapor is the preferred expansive medium because more disruptive work is performed at a lower pressure. The lower the pressure, the less the cost of the cannon.

SMW usually contains considerable water, 25% by weight on a year-round average; green wood may have more. The water entering the cannon with such wet material is sufficient if heated and evaporated to generate most any pressure required. Energy to heat and evaporate the water can be transferred or conducted into the cannon in many forms and transferred or converted to heat inside the cannon.

Disruptive forces are known to operate to reduce the material size of porous material. Both have been discussed separately. They are: the sudden expansion of internal steam or gas; the passing through an area of high turbulence; and the difference in velocity-induced flutter. These function simultaneously at the cannon nozzle.

A fourth disruptive force operating in the nozzle has been described as being caused by the force of acceleration on the leading edges of material in the orifice. The gas is almost instantly accelerated from a low to a very high velocity in a very short distance, the length of the orifice in FIG. 1. The fast flowing gas applies a drag force near the leading edge of the material to accelerate it. The gas, being dense from pressure and elastic, can expand to accommodate a wide range of velocities; but paper, leather, even thin aluminum cannot stretch nor can the drag force accelerate the entire mass it is attached to. The result is that the leading edges of many materials are literally pulled away from the parent material. This is a progressive action that keeps plucking at the leading edge of the material as it approaches the orifice exit.

The turbulence is severe in the orifice exit region. Its mark is left in the pieces of thin aluminum parts. They show creases from having been bent back and forth in all planes. This bending, also called flutter, also occurs in paper and other flexible materials.

Some types of plastic and some cloth do not succumb to the size reduction forces. When steam is used as the expansive medium, these large pieces can be separated from the small particles of cellulose by an exit screen in the slurry discharge line. A belt screen deposits the large pieces onto a conveyor to transport them to the outside.

When a dry gas is used, no such screening may be necessary.

To produce a dryer product on discharge, the gas and material in the cannon can be at a sufficiently high temperature prior to discharge to prevent adiabatic cooling that accompanies expansion from dropping the temperature of the discharged mass much below the ambient dew point. Otherwise, atmospheric moisture will condense onto the exploded material thereby reducing the heating value of the combustible material.

The normal contents of SMW are affected as follows:

1. Paper and paper products such as Kraft containers, milk cartons, books, newsprint, magazine, are reduced to the size of cellulose fibers and smaller at high pressures (600 -1000 psi) at lower pressure (200 psi) to pieces the size of a ten cent coin down to fibers with some sub-fiber sizes. Paper products reduced in this way are in a suitable physical form, as ejected, to use for bulk insulation.

The method of discharge from a pressure vessel as above and below described lends itself readily to a production method for such insulating material. Scrap paper products such as are currently used in secondary paper production, can be impregnated by spraying or immersion with known and approved fireproofing agents either prior to or after treatment in the cannon.

2. Glass and glass containers are shattered to small fragments. Where steam is used as the pressurizing medium and the SMW is discharged over water, glass is further reduced by thermal shock to particles of the size and consistency of coarse sand or fine gravel.

3. Steel cans—the "tin cans" of commerce—are split open or one or both ends are blown off. The can is opened and flattened, and left in a suitable state for de-tinning and recovery of tin and steel. These containers are reduced to pieces the size of postage stamps by high pressure discharge or to half-cans by low pressure discharge.

4. Heavy steel aerosol cans are ruptured, and the valves are destroyed.

5. When steam is used for the pressurizing medium, much of the discharged contents of the steam cannon is completely sterile. Some hydrolysis of the hemi-cellulose content to sugar takes place. At higher steam temperatures from 300° F. and up, some sugar is caramelized. The net result is two-fold:
   a. Unpleasant odor in the SMW is greatly reduced; the discharged material has a mild and rather pleasant smell of caramel.
   b. The material which has been fully penetrated with steam—the organic portion of the SMW is biologically sterile, and therefore stable, and can be stored longer than three weeks.
   c. Metal emerges relatively clean, and in an open and accessible form and an advantageous state for the recovery of constituent metals.

Compressed gases such as air or nitrogen, when used as the pressurizing medium, exert disruptive forces similar to steam on all components of SMW.

The discharge from the cannon is subsequently treated by a wet or dry method, depending on whether the ultimate enduse of the organic portion is chemcial production, e.g., to methane plus $CO_2$, or to ethyl or n-butyl alcohol. These alternatives are discussed further.

Wet Method of Cannon Discharge Employing a Condensable Vapor, Classification and Separation The cannon is discharged horizontally into a large closed tank which is partially filled with water. This tank is called for reference a separation tank. (See FIG. 2). Below the surface of the water is a method of conveyance, such as a belt conveyor, or a drag bar or chain conveyor. In operation, the cellulosic portion of the discharge including exploded wood, leather, vegetables, all plastics, and textiles except unexpanded halogenated polymers such as P.V.C. have specific gravity close to unity, and will mix into the water to form a slurry. Metals, rocks, ashes, concrete, and glass, as well as the heavy plastics, will settle onto the conveyance mechanism. The cellulose portion is removed continuously in slurry form through pipes by pumps and can serve as the feedstock for enzymatic—biochemical reaction to methane or primary alcohols. The heavy fraction is raised from the water and washed by water sprays to free it from cellulose particles which are returned to the tank. The heavy fraction is tumbled to spill out trapped water and is then discharged through a pressure valve onto a heavy fraction conveyance which leads the now concentrated and clean heavy fraction to further separating machinery for resource recovery and to disposal of any residual non-usable portion which at this point consists largely of dirt, sand, and glass.

In this wet method of operation, it is usual to use steam as the pressurizing medium. Almost all the sensible heat of the pressurized and heated solid contents of the steam cannon plus saturated water if saturated steam is used, plus the latent heat of the steam, is retained in the liquid and solid contents of the separation tank. This is of paramount importance when the purpose of the entire operation is the preparation of methane or primary alcohols, where considerations of endothermic reaction rates require maintenence of large volumes of relatively dilute aqueous solutions at temperatures in excess of 95° F.

Since the tank is closed, it must not be overpressured internally for obvious structural reasons and of equal importance, to prevent the diminution of the pressure difference between cannon and separation tank. If pressure in the separation tank is allowed to rise from atmospheric pressure, because of the expanding gas being injected from the cannon, to some higher pressure, say to 15 psig (30psia) the difference between the pressures of the cannon and the separation tank diminish. As long as the cannon pressure is maintained at or above the critical ratio the pressure in the separation tank, critical velocity for the fluid used will be maintained in the cannon discharge nozzle.

If the separation tank were maintained at atmospheric pressure, then critical velocity would be maintained until the cannon pressure bled down to say 33 psig for an example. But if the separation tank were allowed to rise to 15 psig then the destructive force of critical velocity would cease when the cannon pressure bled down to 66 psig. Considering that the cannon peak pressure with steam would be 200 psig, the tail end of the discharge would not have the full benefit of the destructive force of decompression, in which case a high percentage of the discharge could be only partially reduced in size.

It is thus seen that it is desirable to keep the pressure of the separation tank as close to atmospheric pressure as possible. This would be done by spraying water throughout the air space in the separation tank before, during, and after each discharge. The rain of water condenses the expanded steam after it emerged from the cannon, washes the cellulose cloud from the tank "free volume" to the liquid volume, and also the light weight fraction adhering to the separation tank walls and structure is washed off and added to the slurry.

For an example, if a steam cannon is compacted with "standard refuse" to a density of 20 lbs/cu.ft. and is pressurized with steam to 200 psig. then each c.f. of cannon would require 40 c.f. of free volume in the separation tank if the pressure rise are to be restricted to 15 psig in the separation tank without the aid of cooling sprays.

The cannon and separation tank would be designed to the correct complimentary size to prevent the pressure from ever rising above, say, 15 psig. This would be an economy measure to minimize the size of the separation tank, which is the most costly item in the process equipment, but every effort would be made through use of spray condensing to prevent the pressure from rising at all. Even so, to insure that all of the solid material is discharged from the cannon before the cannon pressure drops below 33 psig, an uncompacted reservoir volume near or in the breech can be used to maintain the pressure. Alternatively, opening the steam line between the boiler and the cannon during the discharge can provide the steam for this vital final stage of discharge. In both examples, the pressure drop of the extra steam would be wasted in a sense; but the heat of this steam would pass on into the system.

It is also to be noted that creation of a partial vacuum in a large thin wall tank can be even more disastrous than over-pressurization. A complete separation tank collapse could be expected if the internal pressure dropped below atmospheric pressure.

The low pressure to guard against would be a generalized low pressure throughout the separation tank.

There is another low pressure condition that will occur in the separation tank that is beneficial which occurs near the nozzle exit. This is referred to as over-expansion. It is brought about by having a pressure in the cannon above that need for critical velocity. This prevents complete expansion in the nozzle; so once out of the nozzle, further expansion occurs. Depending upon the excess pressure in the nozzle, expansion outside of the nozzle can proceed to a fraction of atmospheric pressure. Thus, a below atmospheric pressure volume exists within the separation tank. By taking into account the low pressure outside the single step nozzle, the peak pressure in the cannon can be lowered or adjusted to get the desired differential pressure.

A single step orifice or nozzle is sufficient for most work. A two step or a three step nozzle with an expansion skirt as shown in FIG. 3 will render smaller particle sizes at the same pressure or same size particles at a lower pressure differential. The only disadvantage is that the second and third or more stages erode more than the first step or in a single step. It becomes a matter of economics to decide between the cost of gas and steam or multiple step nozzles.

DRY METHOD OF STEAM CANNON DISCHARGE, CLASSIFICATION, AND SEPARATION

For dry operation, dry gas, including superheated steam, compressed air or nitrogen can be used to pressurize the cannon. Even saturated steam made from water in the compacted material can be used. A hot gas supplied to the tank would evaporate some water from the waste. These methods of operation can result in a dry product, under certain conditions drier than the original material charged into the cannon. Dryness is advantageous in preparing SMW for fuel of any kind or for thermal insulation.

In the dry mode of operation, the discharge of SMW from the cannon is discharged into a separation tank equipped to separate the heavy fraction and light fraction by density in a two-stage process. The first stage is to subject the discharge from the cannon to a separation tank interior of such shape that the dry gas expanding from the cannon will reverse its direction of flow, carrying the light fraction with it, while allowing the heavy fraction to continue in the direction of the initial discharge. This can be made to occur several times, using only initial pressurized gas from the cannon to effect the separation. Both fractions can then be, if desired, subjected to a second air classification process employing a pumped source of air in any of several types of air classifiers for final separation of the light and heavy fractions.

Even though the dry separation tank is open, care must still be taken to prevent a pressure build-up for the same reasons cited hereinbefore in the case of the closed separation tank in the wet process. The pressure control can be obtained by design of flow passage proportions as condensation is not available as a pressure control in the dry mode.

Depending on the degree of cleanliness desired, the separator can be a large conventional cyclone separator or a series of cyclone separators. The circular path of the heavy fraction is this type of separator, results in continuous scrubbing on the walls of the cyclone and is a potential cause of high maintenance. A more straightforward flow configuration is seen in FIG. 3. The direction of the heavy fraction flow is not changed but the cross section of the heavy fraction flow path is constructed at each section or reversal station. The openings for the expanded air is large at each reversal station, but the velocity of flow is kept high enough to carry the light weight fraction in the air flow. The reversal of direction separates the heavy fraction which because of its mass and lack of an efficient lift configuration continues on down the decreasing cross-sectional area of conduit. The light fraction that comes out of the reversal stations is collected in an air classifier to remove the light fraction from the air or gas so that the light fraction can be transported to the next process or function.

It is pointed out that the disruptive forces of explosive decompression treatment does not reduce all material to fiber; but in a repulping operation in which bales of used paper, cardboard, etc., are dumped into hydropulpers, the large energy requirement may be very much reduced overall by first discharging the baled used paper from a steam cannon. The effluent from the separators could be transferred to a hydropulper for a finishing operation. In the two types of size reduction systems, the recurrent theme is—a cannon or pressure vessel into which material is placed together with a high energy high pressure medium; steam, compressed air, etc. The rapid expansion of the compressed medium is used first to reduce the size of the material, then is used again in one way or another. In the wet process, the material is passed through an initial air-type separator to separate the gross heavy fraction; but a more advantageous alternative is eventually to condense the vapor in the wet tank, whereby the heat of vaporization is transferred to the water, with consequent saving of energy.

In the dry system, the rapid expansion of the gas is first used to break up the material; then the considerable energy left in the gas is used to transport the material through a planned conduit called a separation tank in which there are one or more sharp directional changes up to and including a complete 180° reversal of direction in which the differences in inertia of the material in the gas stream is employed to cause separation of the heavy fraction from the light fraction.

Energy is expensive; and to be able to use it twice is an important part of this invention. The pressure vessels heretofore described with breech and muzzle closures are batch process machines which may be as large as 8 to 12 to 14 feet in diameter into which most any material can be easily compacted.

Some materials that need to be size reduced, or to have different components taken or blown off and are of a reasonable uniform size to begin with can employ a continuously operating machine.

The continuous and intermittent machine or cannon is ideal for blowing aluminum heads from steel cans. The steel can then be taken from the aluminum by magnetic separation.

At present there is not a recycling market for bimetal cans because the aluminum degrades the alloy property of steel and vice-versa. The air or gas cannon neatly blows the aluminum tops from steel beverage cans.

A cannon, such as disclosed herein, need not have a single orifice, but may have multiple orifices. In this case the orifices may be so directed that, when discharged contemporously, the streams of the ejected material will collide thus further reducing the size of the ejected material by impact.

Alternately, two single-orifice cannon may be positioned such that the discharge streams impinge upon each other with the same size-reducing effect as above mentioned.

The increased size-reducing capability of this configuration of cannon and/or orifices will be most evident in the greater reduction of hard dense or brittle materials. This configuration may best be applied to the size reduction of materials such as coal, glass, stone or any other material which, due to the greater density of its particles, can collide with other objects at speeds great enough to break those particles to a smaller size. Such a configuration also has the advantage that impact is not delivered to the pieces of coal, stone, etc., by backstops, baffles or machinery, but by other pieces of similarly hard material which are themselves thereby size-reduced.

Having thus described a method of front-end size reduction and classification of Solid Municipal Waste, or any other material, i.e., aluminum cans, tinned steel cans, for separation or recovery of materials, and possible preparation of organic content for combustion or as a chemical feedstock.

I claim:

1. A method of treating solid municipal waste and other solid materials containing organic and inorganic substances comprising the steps:
   (a) loading the solid materials into an elongated pressure vessel;
   (b) pressurizing the loaded pressure vessel with compressed gas;
   (c) causing the pressurized contents to rapidly discharge from the pressure vessel through a restricted orifice to thereby promote a powerful turbulence and shock wave;
   (d) collecting the discharged material in a container having a volume substantially larger than the volume of the pressure vessel;
   (e) maintaining the pressure in the container not substantially above ambient pressure;
   (f) causing the discharged material in the container to separate into heavy and light fractions in either a wet or a dry condition; and
   (g) separately removing the heavy and light fractions from the container;
   said method further characterized in that the vessel is discharged horizontally over the surface of water in a tank and where the contents fall into the tank.

2. The method defined in claim 1 wherein the orifice directs the ejected material against or into baffles which aid in the disruptive effect of ejection.

3. The method defined in claim 1 wherein the water tank is enclosed in a vessel and is equipped with a moving belt at some distance below the surface of water.

4. The method defined in claim 1, where the pressurizing medium is compressed air, or compressed nitrogen.

5. The method defined in claim 1 wherein the pressurizing medium is saturated steam, in equilibrium with saturated water.

6. The method defined in claim 1 wherein the pressurizing medium is superheated steam.

7. The method defined in claim 1 wherein the pressure vessel is loaded at one end, and discharged from the other.

8. The method defined in claim 3 whereby the heavy fraction of the discharge, having specific gravity effectively greater than one, settles onto the moving belt and is conveyed and removed from the tank.

9. The method defined in claim 8 whereby the light fraction of the discharged contents, having specific gravity effectively equal to or less than one, is removed by forced flow of the water in the tank, and separated from the heavy portion, and sheet plastic and unfragmented cloth and other unfragmented light fraction.

10. The method defined in claim 1 wherein the pressure vessel is pressurized with a dry gas and discharged into a stream of gas moving in a direction substantially different from the line of discharge of the pressure vessel, effecting the separation of the heavier and lighter fractions by allowing the heavy fraction to settle substantially along the line of discharge of the pressure vessel, while the lighter fraction is blown from the line of discharge and settles at some distance from the line of discharge.

11. The method defined in claim 10 in which the heavy and light fractions are allowed to settle onto conveyors.

12. The method defined in claim 10 in which the light and heavy fractions, after primary separation, are each subjected to a second air separation process by allowing each to pass through an air stream which effects a more refined separation.

13. The method defined in claim 10 in which the residual energy contained in the compressed gases after size reduction is used to separate the light weight material from the heavy weight material.

14. Apparatus for treating solid municipal waste and other solid materials containing organic and inorganic substances comprising:
   (a) means for loading solid materials into an elongated pressure vessel;
   (b) means for pressurizing the loaded pressure vessel with compressed gas;
   (c) means for rapidly discharging the pressurized contents from the pressure vessel through a restricted orifice to thereby promote a powerful turbulence and shock wave;
   (d) means for collecting the discharged material in a container having a volume substantially larger than the volume of the pressure vessel;
   (e) means for maintaining the pressure in the container not substantially above ambient pressure;
   (f) means for separating the discharged material in the container into heavy and light fractions in either a wet or a dry condition; and
   (g) means for separately removing the heavy and light fractions from the container;
   said apparatus further including means to vent the container to prevent over-pressurization thereof and further means for releasing a vacuum from the interior of the container.

15. The apparatus defined in claim 14 further including means to spray-wash - tumble and spray, then tumble dry the heavy fraction to remove any adhered organic material and means to return the organic material to the slurry and further means to rotate the heavy fraction to remove water therefrom and to return the water to the container.

16. The apparatus defined in claim 14 wherein a pool of water is maintained in the container.

17. The apparatus defined in claim 16 including means to stir the water in the container.

18. The apparatus defined in claim 14 including spray means in the container to condense the expanding gas.

19. The apparatus defined in claim 14 wherein the means of clause c includes a nozzle.

20. The apparatus defined in claim 19 wherein the nozzle has a plurality of steps.

21. The apparatus defined in claim 20 wherein the last step of the plurality of steps is off-center in respect to the means for collecting the material discharged from the pressure vessel.

22. The apparatus defined in claim 14 including a gradually expanding section connecting the pressure vessel with container of clause d.

23. The apparatus defined in claim 22 wherein the means of clause c includes a nozzle.

24. The apparatus defined in claim 23 wherein the nozzle has a plurality of steps each of decreased cross dimension.

25. The apparatus defined in claim 23 wherein the nozzle is off-center in respect to the means for collecting the material discharged from the pressure vessel.

* * * * *